United States Patent [19]
Rubio et al.

[11] 3,788,139
[45] Jan. 29, 1974

[54] METHOD AND APPARATUS FOR TESTING ADHESIVE PROPERTIES OF DOUGH-LIKE MATERIAL

[75] Inventors: Manuel Jesus Rubio, Bridgeport, Conn.; Victor Mario Leal, Monterrey, N.L., Mexico

[73] Assignee: Roberto Gonzalez Barrera, Monterrey, Mexico

[22] Filed: Nov. 3, 1971

[21] Appl. No.: 195,306

[52] U.S. Cl. .................................. 73/169, 73/96
[51] Int. Cl. ......................... G01n 3/24, G01n 33/10
[58] Field of Search.... 73/169, 432 R, 88 R, 95, 96, 73/150

[56] References Cited
UNITED STATES PATENTS
2,267,561  12/1941  Halton ................................. 73/169
2,340,401  2/1944  Martin .................................. 73/96

*Primary Examiner*—Donald O. Woodiel
*Assistant Examiner*—Joseph W. Roskos
*Attorney, Agent, or Firm*—Joseph Gray Jackson et al.

[57] ABSTRACT

Process and machine for testing dough-like materials adhesively contacted to spaced bars in generally parallel relation, and having a cut on the sample cross section lengthwise which is variable from end to end intermediate between the bars. Areas of the sample adhesively contacted to the bars have uniform width in the apparatus shown. As the bars move apart and apply tension to the sample, the dough-like material begins failing under monoface cohesion at the point where the intermediate lengthwise section of the sample is narrowest, said failure progressing toward the point where the intermediate lengthwise section of the sample is widest, and it fails under interface adhesion at one of the bars where the sample is widest, progressing toward the point at which the intermediate lengthwise section of the sample is narrowest. When these two types of failures are superimposed or coincident, a point is determined at which the adhesion and cohesion are equal. The testing machine involves acute angled cutters which establish the variable cross section of the sample.

10 Claims, 5 Drawing Figures

METHOD AND APPARATUS FOR TESTING ADHESIVE PROPERTIES OF DOUGH-LIKE MATERIAL

DISCLOSURE OF INVENTION

The present invention involves a method and machine for testing dough-like materials. While it is particularly suited to testing dough for making tortillas, it will also test bread dough, cake batter, candy mix and many other food compositions, and also ceramic mixes, soft plastic mixes and the like as well known in the art.

The invention is based on the principle of determining the point at which the cohesive strength which holds the dough-like material together equals the strength of adhesion which causes the dough-like material to adhere to metal surfaces or other materials used in the testing machine. Since by other methods it is possible to determine the strength of cohesion, therefore this is an indirect method for establishing the strength of adhesion.

This process and apparatus are particularly advantageous as applied to tortilla dough since it has in the not too distant past been made by unscientific methods and it is desirable to evaluate the properties of tortilla dough much more exactly, and thus establish better methods of making tortillas.

A purpose of the invention is to conduct a tensile test of dough-like material which adheres to bars moving apart and taking the place of grips, and to establish a sample cross section intermediate between the bars that is variable from end to end, preferably progressively variable or wedgelike. Thus as the sample fails, it fails by monoface cohesion at the place where the intermediate lengthwise section of the sample is narrowest and weakest and this type of failure progresses toward the place where the sample is widest and the cohesive strength greatest. At the same time the sample pulls away from one or the other of the bars at the end where the sample is widest and this type of interface adhesion failure progresses toward the end at which the intermediate cut of the sample is narrowest. It will be evident in this sort of material that the cohesion over a given cross sectional area is generally greater than the adhesion to a metal surface, so that when applying the tension force over the full width the forces of adhesion will give way instead of the forces of cohesion. On the other hand when the adhesion forces are still working over the same wide area, but the section subjected to cohesion test is much diminished, a point is reached at which the sample fails in cohesion. Eventually, these two kinds of failure are superimposed above one another, thus establishing a place at which the monoface cohesion tension and the interface adhesion tension were equal.

A purpose of the invention is to pull apart a sample of dough, or the like adhering to initially substantially parallel sides generally perpendicular to the direction of pulling in which the sample has a variable and preferably wedge shaped transverse cross section intermediate to the parallel sides and observe the transverse point at which the monoface cohesion failure and the interface adhesion failure against the metal surfaces coincide. In practice, the transverse point is a well determined narrow region.

A further purpose is to subject the specimen to tension by pivoting one of the bars having metal or solid faces which engage the dough-like material away from the other from an initially parallel position to a canted position, the pivot being near the broad cross section of the specimen and remote from the narrow lengthwise cross section of the specimen.

A further purpose is to predispose the specimen of dough-like material for tension test by moving knives forming an acute angle intermediate between of the bars which apply tension and preferably toward the pivot so as to form the narrow lengthwise cross section in the specimen remote from the pivot.

Further purposes appear in the specification and the claims.

In the drawings FIG. 1 is a perspective of an exemplary test mechanism according to the invention.

Figure 1:
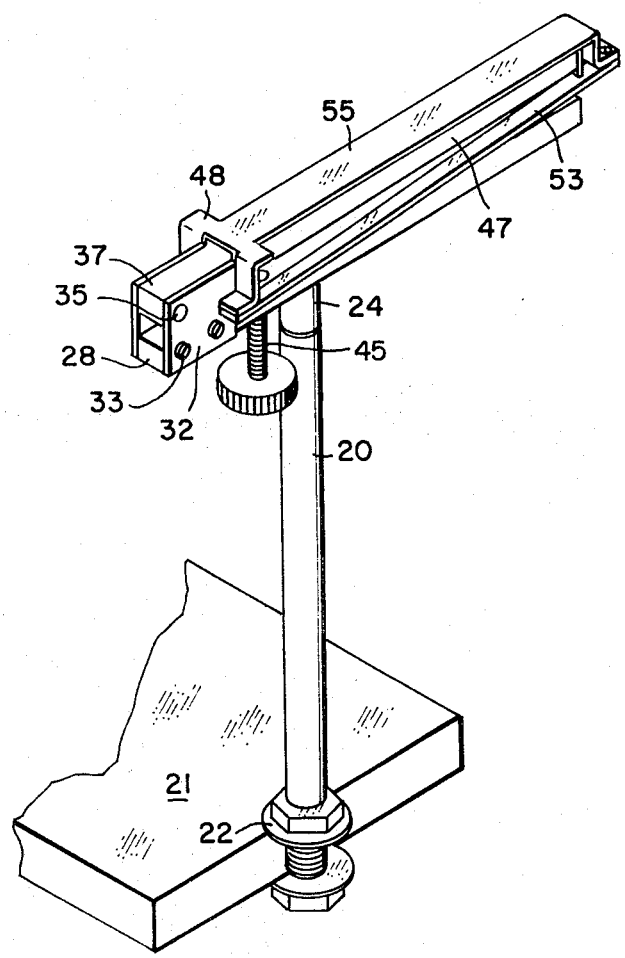
Figure 2:
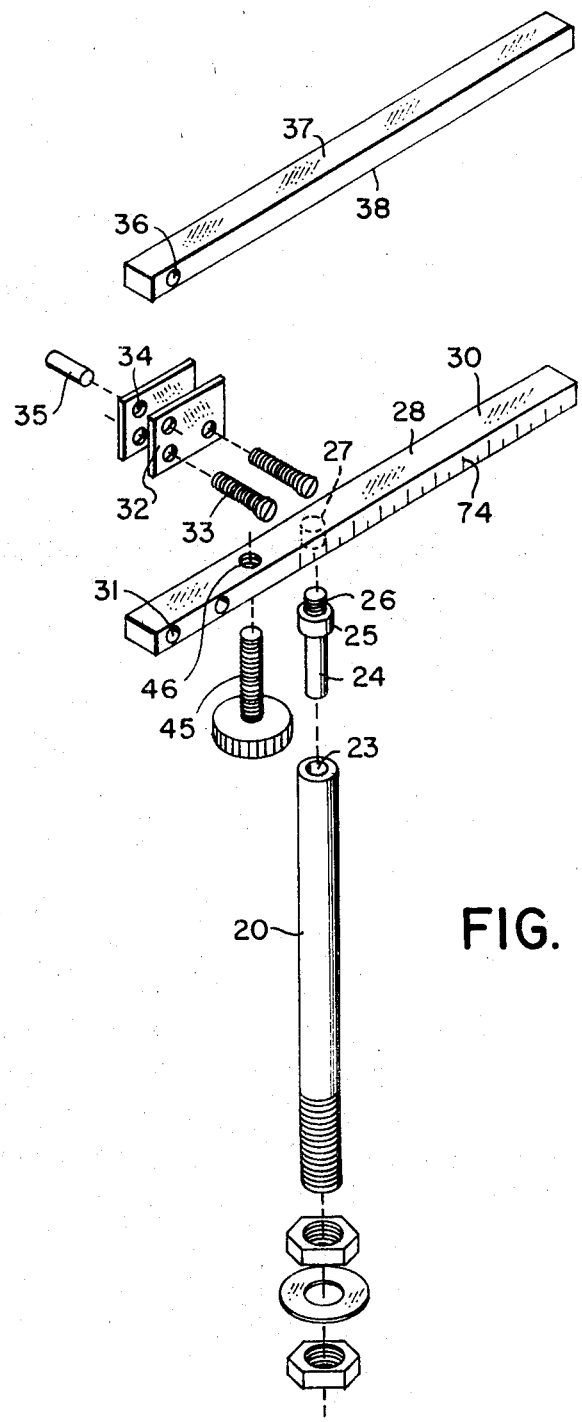
FIG. 2 is an exploded perspective of the test mechanism of FIG. 1 omitting the knives.
Figure 3:
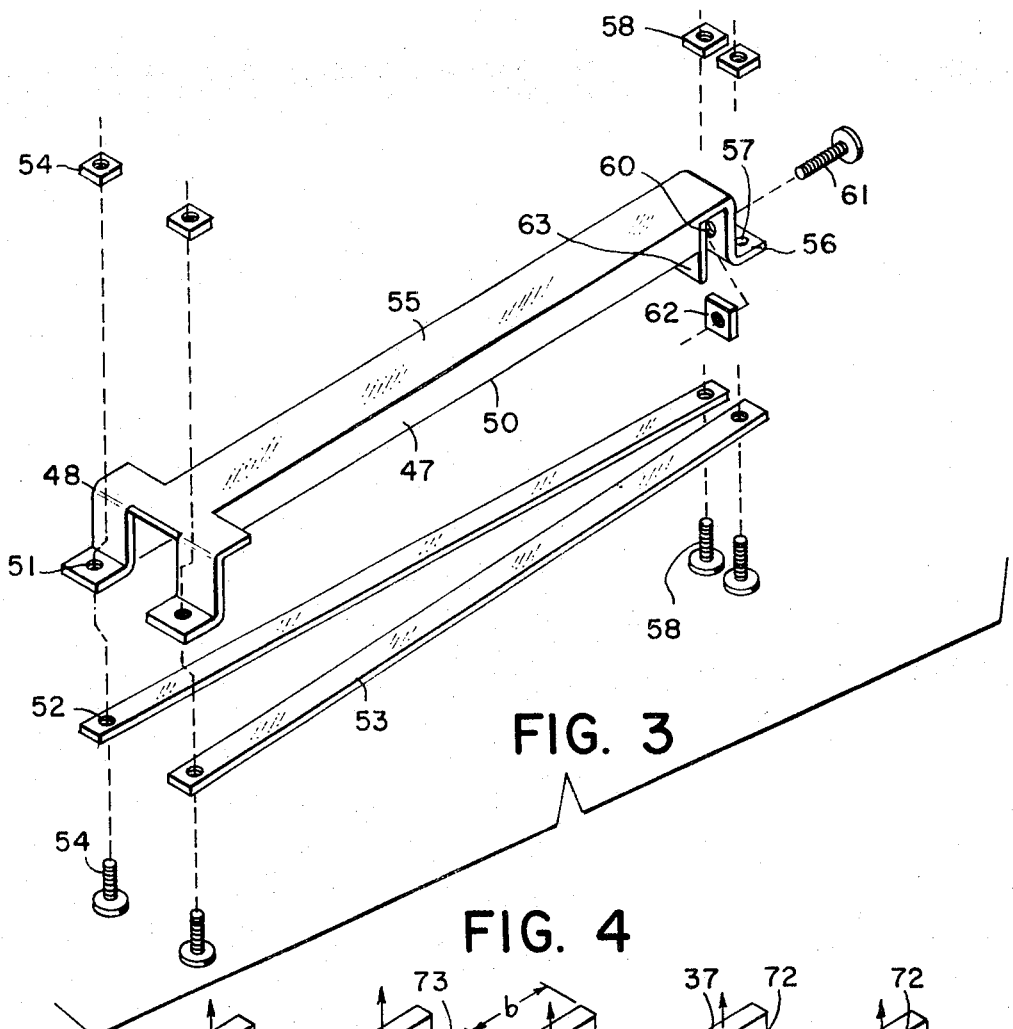
FIG. 3 is an exploded perspective of the knives of FIG. 1.

Dough-like materials and similar soft plastic materials prepared in ceramics, and plastics are difficult to test for adhesion without producing test results which depend upon a mixture of adhesion to a metal or other surface and cohesion within the material itself. Dough-like materials do not lend themselves to gripping by grips as are common in metal and other testing machines, and therefore an entirely different technique must be used if one seeks meaningful results.

In testing doughs, putties, pastes, plastics and the like, there are other means to determine cohesion or tensile strength, but the test methods for adhesion are not as reliable and simple as the present method, which equates adhesion to cohesion, which therefore permits determining the place at which adhesion and cohesion are equal, and therefore determining adhesion by relating it with known cohesional strength determined by conventional and well known procedures.

In the drawings are shown a vertical column 20 which is supported on table 21 by clamping nuts and washers 22 and which has at the top an opening 23 which receives a vertical pivot 24 having a collar 25 and threads 26.

Mounted in the threads 26 of the pivot by threads 27 is a first bar 28 which is desirably horizontal, having horizontal smooth or otherwise specially ground face 30 to which the specimen may be adhered.

The bar 28 has openings 31 which support hinge plates 32 in generally vertical planes by screws 33. The hinge plates 32 have cooperating pivot openings 34 which support a horizontal pivot 35 and hold it against falling out by any suitable means. The pivot 35 passes through pivot opening 36 of a bar 37 which is preferably an opposite counterpart of the bar 28, and which can lie parallel to it and in spaced relation, the lower face 38 being adapted to adhere to the dough-like test specimen, cooperating with the face 30 during testing.

In order to rock the bar 37 away from its parallel position with respect to the bar 28, a thumb screw 45 is threaded through a vertical opening 46 in the bar 28, the thumb screw bearing against the bar 37.

In order to perform the cutting function later discussed, a carriage 47 is slidable along the bar 37 in a longitudinal direction and generally horizontally. This carriage has at the one end a yoke 48 which straddles the bar 37 and two lateral longitudinal strips 50 which slide along the bar 37. At the ends of the yoke 48 there are ears 51 which engage openings 52 in knives 53 which are converging or acute angle having their point of approximately convergence remote from the yoke 48. The knives 53 are anchored to the ears 51 by bolts 54 and their cooperating nuts. Strips 55 and 50 form a U-shaped saddle.

The upper strip 55 has ear 56 which has openings 57 which receive bolts and nuts 58 to hold the other ends of knives 53.

Through a generally vertical portion of strip 55 extends threaded opening 60 which receives screw 61 having lock nut 62 which engages the vertically disposed plate 63 and permits adjusting the tension of the knives 53.

In utilizing the invention the knife carriage and the knives are first removed from the testing machine. A specimen of dough-like material is preferably rolled out into an elongated cylinder long enough to extend from the screw 45 to the distant end of the bar 28 and, with the bar 37 set initially in the parallel position to the bar 28, the bar 37 is raised and the specimen 70 is placed on the face 30 of the bar 28 and the bar 37 is pushed down into horizontal position, making the dough-like specimen adhere to the lower face 38 of the bar 37 as well as to the upper surface 30 of bar 28 and squeezing out the excess of dough-like specimen on each side of the bars 28 and 37.

This establishes a zone of adhesion 71 along the upper surface 30 of the lower bar 28 and a zone of adhesion 72 along the lower surface 38 on the upper bar 37.

Figure 4:
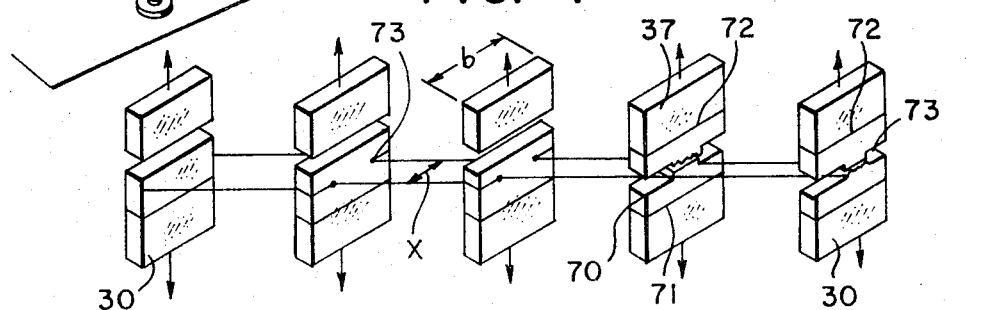
FIG. 4 is a series of transverse vertical sections showing the behavior of the test specimen when tension is applied.

Having established the specimen adhering to the upper and lower bars and occupying the full space between the cooperating bars in horizontal position, the excess of the dough-like material is removed as by running a spatula or knife along the sides of the bars. Then the knife carriage is inserted over the bar 37 with the yoke straddling the bar and the knives at their widest spacing on either side of the specimen 70, and the carriage is slid toward the pivot until the vertical plate 63 reaches an end of the bar 37, at which point the knives have produced horizontal cuts 73 from opposite sides which have partially cut through the specimen remote from the pivot as indicated at the right of FIG. 4, but left the specimen uncut as indicated over at the left of FIG. 4. It will be evident that this cut makes the effective uncut part of the sample have a variable width. The cut is made intermediate between the two bars preferably exactly equal distance between the two bars, but in any case not close enough to either bar to disturb the residual sample over the full area since this sample must have adequate adhesion to the bars to transmit the cohesion test load at the right of FIG. 4.

After performing its function of making a variable horizontal lengthwise cross-section of the specimen, actually wedge like, the knife carriage is slid off from the bar 37 opposite the pivot and removed from the machine.

Common experience indicates that in dough-like materials generally, the cohesion or forces which hold them together is greater than the adhesion over the same cross-sectional area. Accordingly, at the extreme left in FIG. 4 the adhesive forces are bound to yield on the upper or lower metal bars, while the portion of the specimen subjected to the cohesive forces applied over the same cross sectional area remains unimpaired. The separation is shown between the dough-like material and the upper bar in the left hand element of FIG. 4, although it is immaterial whether the yield is at the upper bar or the lower bar, except that wherever it is initiated it will generally continue down the bar.

At this left hand element the adhesion and cohesion act over the whole width $b$ of the bar as shown.

At the successive elements toward the right in FIG. 4 the cut 73 is deeper and deeper and at the extreme right hand element of FIG. 4 it is a maximum from each side. Thus toward the right in FIG. 4, there is some element subjected to tension in which the adhesion applies over the full width of the bar, but the cohesion applies over such a narrow space that failure takes place. As shown, this is true in the right two elements where there is cohesive failure. There is no adhesive failure for the adhesion is over the full width of the bar $b$ and so, though the adhesion per unit area is less, the total adhesion is greater than the narrow element cohesion over the width X which varies from end to end.

Figure 5:
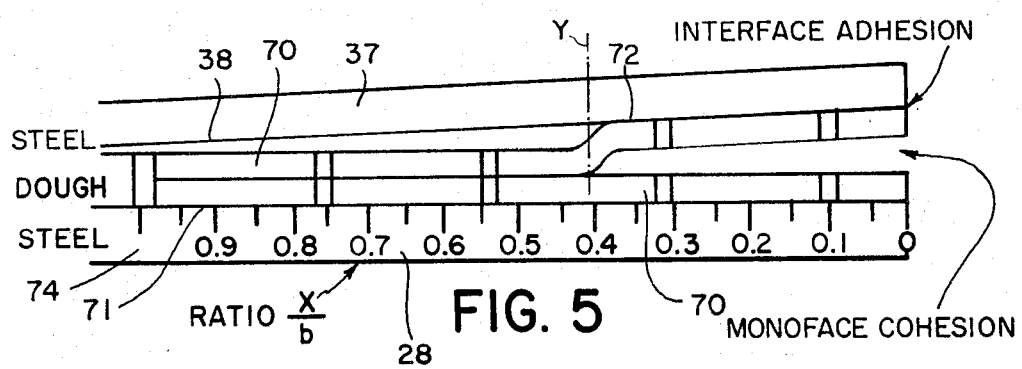
FIG. 5 is a side elevation showing the testing bars and the test specimen as it undergoes test, somewhat idealized to show the principles of the invention.

As the bars are separating from each other, there is a progressive cohesive failure which moves to the left in the elements shown, while the adhesive failure moves toward the right and eventually there is an intermediate element in which the adhesive strength over the whole width $b$ and the cohesive strength over the width X are just equal. This point is designated Y in FIG. 5.

The scale 74 on bar 28 is in terms of the ratio X over $b$ and the point Y is measured at a certain ratio, in this case 0.4.

EXAMPLE

Very good results have been had with bars of 30 × 2.5 × 1.25 cm, which are separated when in parallel position by a distance of 1 cm. When the excess of the sample is cut off by a spatula at the side, this sample therefore is a rectangular, dough-like mass 2.5 × 1 cm in cross section, somewhat less than 30 cm long. When the cutters have done their work and produced the cuts lengthwise of the sample at 73, the elements shown in FIG. 4 of sample cross section are each in general overall outline parallelepiped adhered full width to surfaces 38 and 30, and since the cut is in the middle, the dough-like sample is 1/2 cm thick above and 1/2 cm thick below the cut, but its adhesion is held by the bar which is 2.5 cm wide all along its length. It has been found that the location of the point where adhesive interface failure is exactly above the cohesive monoface failure is very easy, and the instrument can be read with accuracy. The test is stopped at the moment at which both failures are coincidental and clearly observable.

If, by other means as well known in the art, the cohesive breaking stress $S_c$ can be determined, then the breaking stress under adhesion $S_a$ is equal to $r\, S_c$ where $r$ is the ratio found by reading the scale of X over $b$. The dimension $b$ is constant and X is a variable.

It will be evident that the invention solves several problems which have been difficult to solve in the art.

Plastic doughs which are adhesive and soft cannot be fastened by moveable jaws in the ordinary way to measure their tensile strength. Accordingly, in this testing procedure two properties of the dough are measured against themselves, thus making it possible to determine the adhesion when the cohesion is known.

The apparatus of the invention is simple, reliable, rough and cheap, which enables it to be used by laboratory and food technicians in production control and scientific work.

In experimental work, for example, it has been used to find the adhesiveness of flour and water mixtures when the proportions are changed.

It will be evident that instead of knives, wires may be used as a cutting device as well known, for example, in cutting soap.

It will be evident that the tension need not be applied to a pivoted bar, and the bars can move in parallel relation if desired.

It will also be evident that the dimensions of the bars can be changed.

In the design of the invention the parts of the device will preferably be made of some corrosion resisting metal such as stainless steel, although they can also be made of steel, bronze, brass, copper, aluminum or the like. For many test results the adhesion to a metal bar will not be significantly different, depending upon whether the bar is made of one metal or another. For precise results, however, it is preferable to use the same material such as the same anlysis of stainless steel for all tests.

In view of our invention and disclosure, variations and modifications to meet individual whim or particular need will doubtless become evident to others skilled in the art, to obtain all or part of the benefits of our invention without copying the structure shown, and we therefore, claim all such insofar as they fall within the reasonable spirit and scope of our claims.

Having thus described our invention, that we claim as new and desire to secure by Letters Patent is:

1. A method of testing adhesive properties of dough-like materials, which comprises placing a sample of a dough-like material between spaced generally parallel bars, removing any excess of sample beyond the bars, in a plane intermediate to the bars partially cutting the sample longitudinally to make the cut of variable depth, pulling the bars apart to exert tension on the sample and to disrupt the cohesive forces in the sample from the narrow end toward the wider end and at the same time disrupting the adhesive forces between the sample and one of the bars beginning at the wider end, and determining the point or region at which the cohesive failure and the adhesive failure can be observed to meet.

2. A method of testing adhesive properties of dough-like materials, which comprises placing a sample of dough-like material between bars, placing the bars together against the sample and extruding the excess of sample from between the bars until the dough-like material adheres to the bars and the bars are generally in parallel relation, removing the excess of sample at the sides of the bars, partially cutting the sample intermediate between the bars so as to make cuts of variable depth lengthwise of the sample from end to end, pulling the bars apart to exert tension on the sample, initiating failure in the dough-like material itself at the end at which it is of narrow sample cut cross section progressing toward the end at which it is of wider sample cross section, initiating separation of the bar-dough interface (adhesion failure) at the end in which the sample at the cut is of wider cross section progressing toward the end at which the sample is of narrower cross section, and determining the point at which the progressive failure of the sample itself and the progressive failure of the interface between the bar and the sample meet.

3. A method of claim 2, in which the bars separate by rocking about the pivot near the end at which the sample is of wider cross section when tension is applied.

4. A method of claim 2, which comprises cutting lengthwise the sample in a wedge shape on both sides of the bars.

5. A method of determining the adhesive properties of dough-like material, which comprises adhering the dough-like material to two spaced tension bars, removing excess sample between the bars at the sides, partially cutting the sample longitudinally in a plane between the tension bars so that the uncut sample width will be variable, being narrower at one place and wider at another place, pulling the tension bars apart and thus subjecting the sample to tension, so that it breaks or tears both in the dough itself where the intermediate lengthwise section is narrower and in the bar-dough interface where the cross section is wider, and determining the point at which the failure of the dough itself and the failure of the bar-dough interface are coincidental.

6. A machine for testing adhesive properties of dough-like materials, which comprises opposite tension bars in spaced relation between which a sample of dough-like material can be placed, means for exerting tension on the sample by separation of the bars, and cutting means moving in the plane between the bars in a direction lengthwise of the bars, and progressively varying in depth of cut, for partially cutting the sample to leave a variable sample cross section, wide at one end and narrow at the other end.

7. A machine of claim 6, in which the cutting means partially cuts both sides of the sample, making cuts of variable depth lengthwise of the sample.

8. A machine of claim 7, having means for sliding the cutting means along one of the bars and establishing a wedge-shaped sample lengthwise cross section.

9. A machine of claim 7, having pivot means at one end of one of the bars, the end at which the bar is pivoted being the end at which the sample cross section is wider.

10. A machine for testing the adhesive properties of dough-like materials, comprising a first bar, a scale along the length of the first bar for measuring test materials, a second bar pivoted to the first bar and having a position at which the bar faces are parallel although the bars are in spaced relation, means for rocking the first bar with respect to the second bar, and a cutter slidable with respect to the second bar having converging knives and adapted to make a cut of variable depth lengthwise of the dough-like sample intermediate between the bars which is wider toward the pivot end and narrower remote from the pivot end.

* * * * *